United States Patent
Henkel et al.

(10) Patent No.: US 6,682,435 B2
(45) Date of Patent: Jan. 27, 2004

(54) TRIPOD JOINT

(75) Inventors: Juergen Henkel, Kernen (DE); Peter Muenich, Fellbach (DE); Rolf Schroeder, Stuttgart (DE); Guenter Woerner, Kernen (DE)

(73) Assignee: DaimlerChysler AG, Stuttgart (DE)

( * ) Notice: Subject to any disclaimer, the term of this patent is extended or adjusted under 35 U.S.C. 154(b) by 0 days.

(21) Appl. No.: 10/227,017

(22) Filed: Aug. 23, 2002

(65) Prior Publication Data

US 2003/0040367 A1 Feb. 27, 2003

(30) Foreign Application Priority Data

Aug. 23, 2001 (DE) .......................... 101 41 439

(51) Int. Cl.⁷ ........................... F16D 3/205; F16C 31/04
(52) U.S. Cl. ..................... 464/111; 384/50; 384/56; 464/120; 464/167; 464/905
(58) Field of Search ............... 384/50, 54, 56; 464/111, 905, 167, 120, 132

(56) References Cited

U.S. PATENT DOCUMENTS

| | | |
|---|---|---|
| 4,592,735 A | 6/1986 | Orain |
| 4,619,628 A | 10/1986 | Orain ........................ 464/111 |
| 4,708,693 A | 11/1987 | Orain ........................ 464/111 |
| 4,741,723 A | 5/1988 | Orain ........................ 464/111 |
| 4,776,707 A * | 10/1988 | Olschewski et al. .......... 384/51 |
| 4,840,600 A | 6/1989 | White et al. ................ 464/111 |
| 5,184,978 A * | 2/1993 | Fillmore et al. ............ 464/111 |
| 5,277,660 A | 1/1994 | Uchman ...................... 464/111 |
| 5,803,814 A | 9/1998 | Welschof |
| 5,827,121 A | 10/1998 | Bando et al. ................ 464/111 |

FOREIGN PATENT DOCUMENTS

| | | |
|---|---|---|
| DE | 28 16 646 | 10/1979 |
| DE | 34 39 971 | 5/1985 |
| DE | 43 27 606 | 2/1995 |

* cited by examiner

Primary Examiner—Lynne H. Browne
Assistant Examiner—Kenneth Thompson
(74) Attorney, Agent, or Firm—Kenyon & Kenyon

(57) ABSTRACT

A tripod joints includes a joint outer part and a joint inner part. The joint inner part has a tripod star with ball pins, which transmits a drive torque from the joint inner part to the joint outer part via a pressure element and via rolling bodies which are arranged between the joint outer part and a running surface of the pressure element. The running surface of the pressure element is curved in the rolling direction of the rolling bodies. The force may be distributed more uniformly between the rolling bodies when large drive torques are intended to be transmitted. The tripod joint may be suitable for the displaceable and pivotable driving connection of two shaft ends, e.g., in conjunction with drive trains or half shafts of motor vehicles.

2 Claims, 3 Drawing Sheets

TRIPOD JOINT

CROSS-REFERENCE TO RELATED APPLICATIONS

The present application claims priority to Application No. 101 41 439.0, filed in the Federal Republic of Germany on Aug. 23, 2001, which is expressly incorporated herein in its entirety by reference thereto.

FIELD OF THE INVENTION

The present invention relates to a tripod joint for two ends of a drive shaft.

BACKGROUND INFORMATION

Tripod joints are used, for example, as half shafts of motor vehicles. In this case, the tripod joints are used for transmitting drive torques between two drive elements of a drive train. The tripod joints permit relative displacement and relative pivoting of the drive elements to be compensated for. For the use in the case of half shafts of a motor vehicle, relative movements of this type are caused by spring deflections of the vehicle wheels.

U.S. Pat. No. 4,619,628 describes a tripod joint having a joint outer part and a joint inner part held in the joint outer part. The joint inner part has a tripod star having pins with a ball body. The ball bodies are accommodated pivotably in a partially spherical universal ball joint of a pressure element and are therefore mounted pivotably with respect to the pressure element. The pressure element has a running surface on the side facing away from the ball body. Rolling bodies are arranged between the running surface and a mating surface of the joint outer part, in order to transmit the drive torque.

It is an object of the present invention to provide a tripod joint which is optimized with regard to the forces which occur in the region of the running surfaces, of the mating surfaces and of the rolling bodies.

SUMMARY

The above and other beneficial objects of the present invention are achieved by the tripoid joint as described herein.

Investigations have shown that, particularly when large drive torques need to be transmitted, elastic deformation occurs in the components which form the mating surfaces and the running surfaces.

By way of example, if a force is introduced centrally through the ball body, that subregion of the running surface which projects in the running direction bends as a consequence of the reaction forces exerted by the rolling bodies. As a consequence of this, the distance between the running surface and the associated mating surface is increased in this subregion (in the micrometer range). As a consequence of this, the force to be transmitted decreases in the outer subregions of the running surface. This leads to the force being distributed inhomogeneously over the running surface. With a predetermined maximum surface pressure in the region of maximum forces, the maximum force which can be transmitted is thus not utilized in the outer subregions, while an optimum force distribution is achieved only for small drive torques.

According to the present invention, the running surface of the pressure element is curved in the running direction of the rolling bodies. The curvature is such that the distance between the running surface and the planar mating surface decreases in the direction of the outer subregions. The curvature is configured such that, when large drive torques need to be transmitted, an approximately planar running surface is produced, so that the forces to be transmitted are approximately equal on all the rolling bodies.

In consequence, all the rolling bodies may be stressed to a uniform extent, thus resulting in improved running characteristics and reduced wear. The surface pressures on the running surface and on the mating surface are likewise optimized, so that the wear on these operating surfaces may also be reduced. The drive torques which may be transmitted may be increased for the same component dimensions. According to the present invention, a non-uniform force distribution is therefore accepted for small drive torques, while an optimum force distribution may be achieved for large drive torques. The pressure element may be designed to be thinner, and it is possible to deliberately accept elastic deformation of the pressure element, which may be compensated for by the curvatures for large loads. This may result in a more compact tripod joint.

The running surface of the pressure element may include entry inclines or radii in the entry region of the rolling bodies. This makes it possible to improve the threading of the rolling bodies into the running surface, and hence into the force flow. In addition to reducing the mechanical stress on the components involved, this may result in a reduction in sudden force changes, which occur as a result of the threading-in process, during movement or pivoting of the tripod joint.

Exemplary embodiments of the tripod joint according to the present invention will be explained in greater detail below with reference to the drawings.

DETAILED DESCRIPTION

Figure 1:
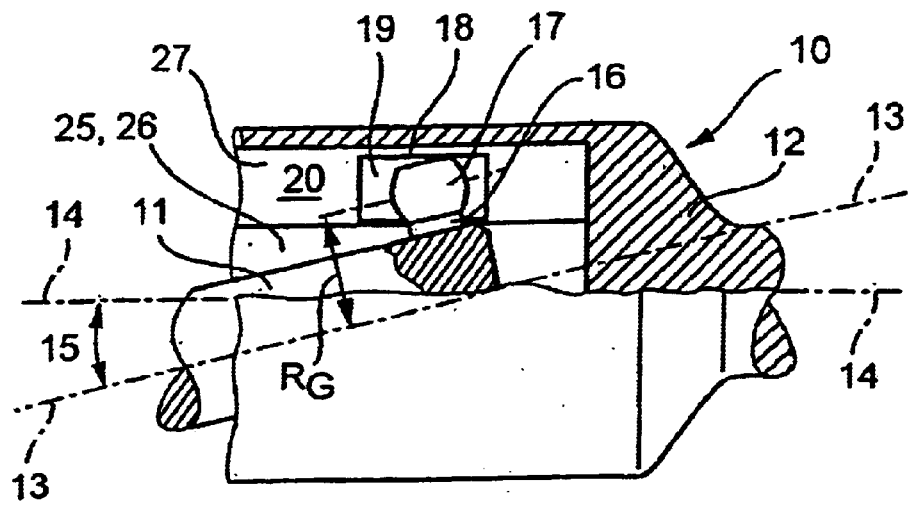
FIG. 1 is a longitudinal cross-sectional view of a tripod joint according to an example embodiment of the present invention.

A tripod joint 10 has a joint inner part 11 and a joint outer part 12 holding the joint inner part 11. The joint inner part 11 and the joint outer part 12 are in each case connected, at least in a rotationally fixed manner, to a drive element of a drive train of a motor vehicle, for example to a drive shaft and a vehicle wheel. The tripod joint 10 is used for transmitting a drive torque between the joint inner part 11 and the joint outer part 12 while ensuring a relative displacement along the longitudinal axis 13—13 of the joint inner part 11 and along the longitudinal axis 14—14 of the joint outer part 12, a relative pivoting of the joint inner part 11 with respect to the joint outer part 12, which pivoting is associated with a change in the angle 15 between the longitudinal axes 13—13 and 14—14, and a three-dimensional movement which arises from a combination of the abovementioned forms of movement.

The joint inner part 11 has, at the end arranged on the inside, three pins 16 which are formed as a single piece or a number of pieces together. The three pins 16 are orientated radially and are distributed in each case at 120° in the circumferential direction and form a tripod star. The pins 16 have in each case a partially spherical ball body 17. In order to transmit forces in both circumferential directions, the ball body 17 bears, in each case in the region of the spherical lateral surface, against a correspondingly configured recess 18 of a pressure element 19. On the opposite side of the pressure element 19, which side faces a flat mating surface 20 of the joint outer part 12, the pressure element is of flat configuration with a running surface 21.

Cylindrical rolling bodies 23, in particular rollers or needles, are held between the running surface 21 and the mating surface 20, forming a linear contact. A plurality of rolling bodies 23 are guided in a cage 24. In order to transmit circumferential forces in the opposite direction, each pin 16 is configured with two associated pressure elements 19, the rolling bodies 23 and the surfaces 20 and 21, all symmetrical to a pin central plane accommodating the longitudinal axis 13—13.

The running surface 21 of a pressure element 19 may have a rectangular form. Consequently, as many rolling bodies 23 as possible may be used thereby forming a load-bearing contact with a reduced surface pressure. The present invention is not limited to pressure elements 19 with rectangular forms. Circular or oval pressure elements 19 are also possible.

The joint outer part 12 has a recess 25 orientated in the direction of the longitudinal axis 14—14 with an essentially circular, central hole 26 and three holding spaces 27 which are orientated radially and are distributed in each case at 120° in the circumferential direction and are used in each case for holding and supporting a pin 16, two pressure elements 19 and rolling bodies 23. In the section illustrated in FIG. 2, the holding spaces 27 have an essentially U-shaped contour open in the direction of the hole 26, the side limbs of the U-shaped contour being formed with the mating surfaces 20. In the example embodiment illustrated in FIG. 2, the side limbs are of rectilinear configuration without a transitional region to the mating surfaces 20. In the direction of the hole 26, the side limbs do not, in particular, have any projections or depressions, but rather merge into the hole 26 with an enlargement of the spacing. In the position of the tripod joint illustrated in FIG. 2, the rolling bodies 23 together with the cage 24 are arranged spaced apart radially from the main limb of the U-shaped contour.

Figure 2:
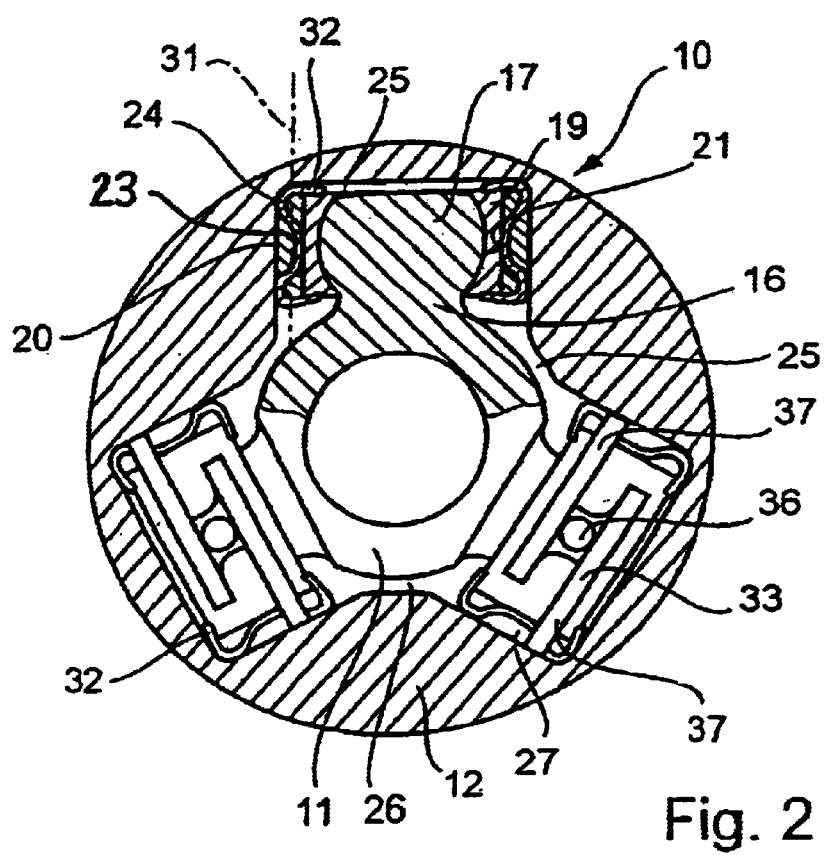
FIG. 2 is a cross-sectional view of a tripod joint according to an example embodiment of the present invention.

As illustrated in FIG. 2, the rolling bodies 23 are guided in a cage 24. The rolling bodies 23 are guided in the cages 24 with the relative position of the longitudinal axes 31 of the rolling bodies 23 with respect to each other being ensured. The cages 24 are guided in the radial direction with respect to the pressure element 19 over shoulders 32 engaging around and enclosing the pressure element 19. The cages 24 may be "clipped" via the shoulders 32 onto the pressure element 19, as illustrated. The cages 24 may furthermore be centered in the running direction of the rolling bodies 23 via centering or spring elements 33. Two cages 24 of a pin 16 may be guided and centred via a common spring element 33.

Two pressure elements 19, which are each associated with one ball body 17 for both circumferential directions, may be connected via two connecting webs to form an integral pressure body. A bayonet connection may be configured so that the ball body 17 may be inserted into the integral pressure body.

According to the example embodiment illustrated in FIG. 2, two spring elements 33 are connected to the pressure elements 19 or the ball body 17 via a respective fastening arrangement 36. The spring elements 33 in each case have two elastic fingers 37 which bear against the opposite cages 24 or are connected thereto, for the purpose of supporting them.

In comparison with the ball body 17, the cage 24 having the rolling bodies has, in particular, just two degrees of freedom: a suitably selected connection of the ball body 17 to the pressure elements 19 may ensure pivotability about an axis perpendicular with respect to the plane defined by the longitudinal axis 13—13 of the joint inner part 11 and the longitudinal axis of the pins 16. The second degree of freedom is the connection between the cage 24 and pressure elements 19, which connection may be displaced in a translatory manner. In order to ensure that the pressure element 19 may pivot with respect to the ball body 17, the pressure element 19 may hold the ball body 17 in a universal ball joint.

Figure 4:
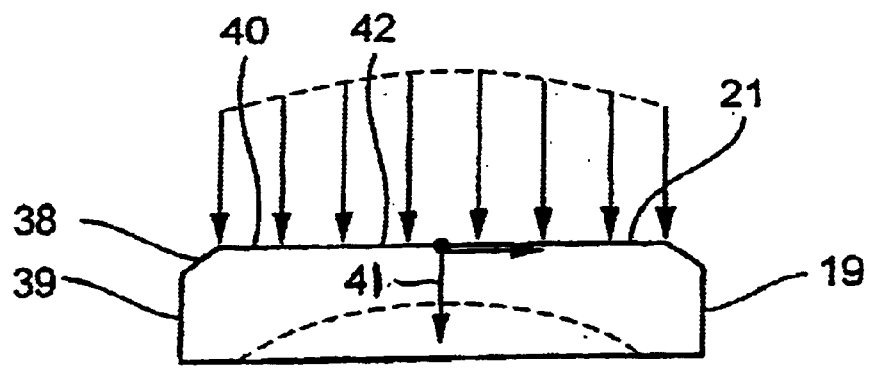
FIG. 4 illustrates the transmission forces that occur on a conventional pressure element of a tripod joint from rolling bodies during operation.

As illustrated in FIG. 4, the pressure element 19 has transitional regions 38 between the end surfaces 39 and the running surface 21. In the simplest case, the transitional regions are in the form of a phase. Alternatively, they may be curved, e.g., with a smooth transition to the running surface 21. The transitional regions 38 may improve the threading-in process for the rolling bodies 23 between the running surface 21 and the mating surface 20 during operation of the tripod joint 10.

FIG. 4 illustrates a conventional pressure element 19 with a planar running surface 21 in the unloaded state. The load transmitted when the drive torques are high lead to elastic deformation of the outer subregions 40 of the pressure element 19 in direction 41, i.e., away from the associated mating surface 20. The force transmitted in the outer subregions 40 decreases as a result of bending and as a result of an increased distance between the mating surface 20 and the running surface 21 in the outer subregions 40.

Figure 5:
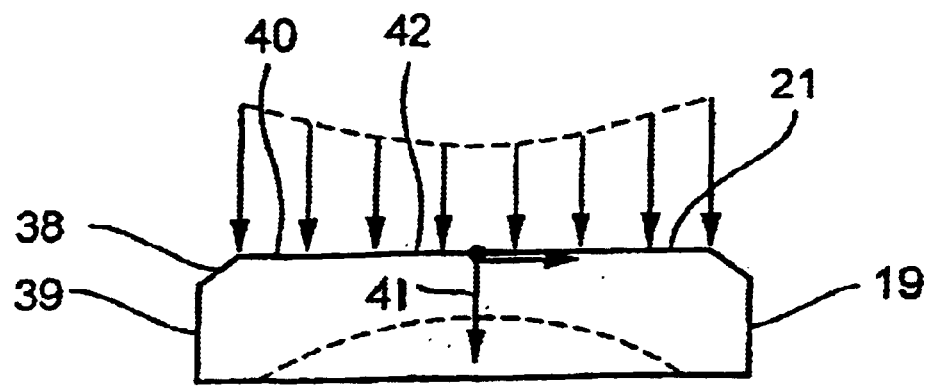
FIG. 5 illustrates the transmission forces that occur on a pressure element of a tripod joint according to an example embodiment of the present invention from the rolling bodies during operation when drive torques are small.

FIG. 5 illustrates shows the force distribution on a pressure element 19 for small drive torques for an example embodiment of the present invention. The resulting curvature of the running surface 21, which is oriented in the direction opposite the direction 40 from the centre in the running direction, results in the distance between the running surface 21 and the associated mating surface 20 being less in the outer subregions 40 than that from the inner subregions 42. Accordingly, the forces which may be transmitted in the outer subregions 40 may be greater than in the inner subregions 42.

Figure 6:
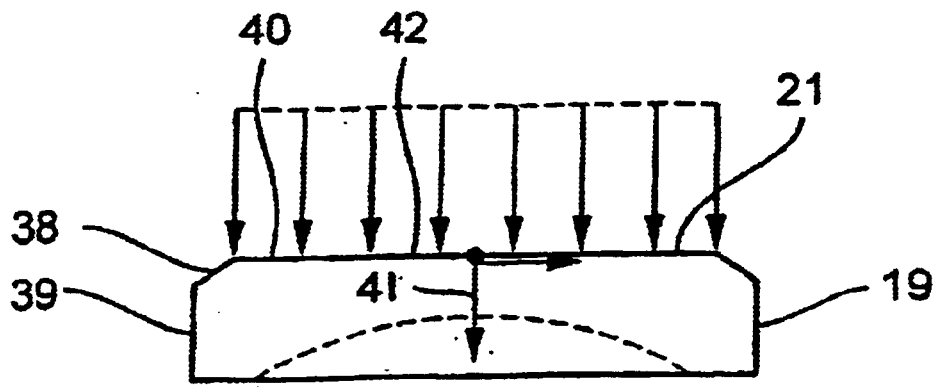
FIG. 6 illustrates the transmission forces that occur on a pressure element of a tripod joint according to an example embodiment of the present invention from rolling bodies during operation when drive torques are large.

FIG. 6 illustrates the force distribution on pressure element 19 for high drive torques for an example embodiment of the present invention. The curvature of the running surface 21 is compensated for by the elastic deformation of the pressure element 19. All the subregions 40, 42 of the running surface 21 are thus at approximately the same distance from the mating surfaces 20. The forces which occur in the subregions 40, 42 are approximately uniformly distributed.

Figure 3:
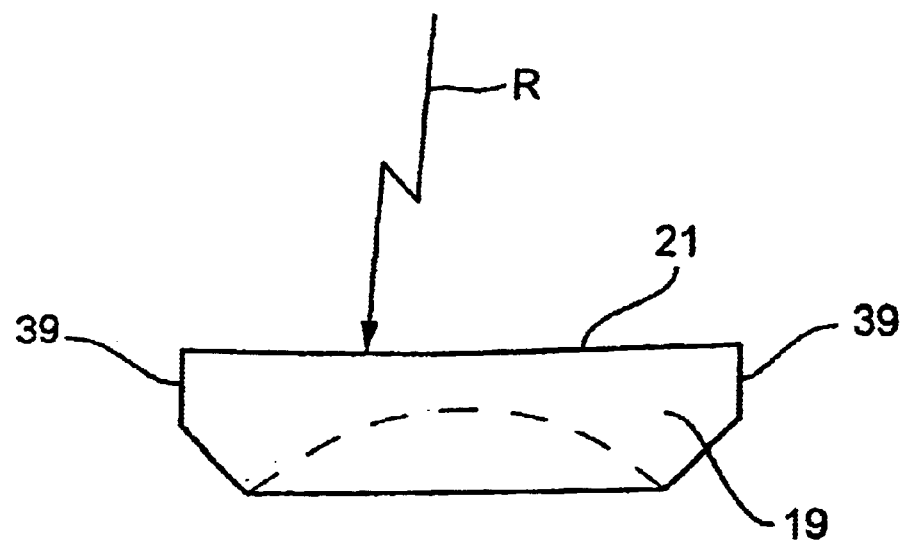
FIG. 3 illustrates a pressure element of a tripod joint according to an example embodiment of the present invention.

The necessary curvature of the running surface 21 may be determined by a finite element calculation of the running surface/rolling body/mating surface system for the drive torques to be expected. The running surfaces 21 may be curved in the form of a circular arc, with a radius R as illustrated in FIG. 3. In the example embodiment illustrated in FIG. 3, the difference in the distances between the central subregions 42 of the running surface 21 and the outer subregions 40 from the mating surface 20 is in the micrometer range.

The present invention is not limited to running surfaces 21 with circular arc curvatures. Other curvatures are possible and are included herein. In addition, a tripod joint according to the present invention may include a mating surface 20 with a curved configuration as an alternative to or in addition to the curved running surface 21.

The configuration according to the present invention is suitable for any arrangement of a tripod joint for which a pressure element is connected in the force flow. Reference is made, for example, to U.S. Pat. No. 4,619,628, German Published Patent Application No. 28 16 646 or U.S. Pat. No. 4,708,693.

According to the present invention, the rolling bodies 23 may be guided in the cage 24 with parallel longitudinal axes 31 of the rolling bodies 23, or with longitudinal axes 31 inclined at an acute angle to one another.

If the mating surfaces 20 are planar, the rolling bodies 23 may be in the form of cylindrical rollers each with the same radii so that the contact surfaces of the rolling bodies 23 that face the pressure element 19 are on one plane.

The example embodiments above include arrangements only given by way of example. A combination of the described features for different example embodiments is possible. Further features, in particular features which have not been described, of the device parts belonging to the invention are to be taken from the device-part geometries illustrated in the Figures.

What is claimed is:

1. A tripod joint for transmitting a drive torque between two drive elements of a drive train, comprising:
    a joint inner part including a tripod star having pins with a ball body, the ball bodies arranged in a pressure element and pivotable with respect to the pressure element;
    a joint outer part configured to hold the joint inner part; and
    rolling bodies arranged between a running surface of the pressure element and a planar mating surface of the joint outer part, the drive torque transmittable to the joint outer part via the pressure element and via the rolling bodies;
    wherein the running surface of the pressure element is curved in a running direction of the rolling bodies so that a distance between the running surface and the planar mating surface decreases in a direction of outer subregions.

2. The tripod joint according to claim 1, wherein the running surface of the pressure element includes one of inclines and radii at a region of entry for the rolling bodies.

* * * * *